United States Patent
Chun et al.

(10) Patent No.: US 8,705,459 B2
(45) Date of Patent: Apr. 22, 2014

(54) METHOD FOR MULTIPLEXING CONTROL SIGNALS IN A MOBILE COMMUNICATION SYSTEM

(75) Inventors: Jin Young Chun, Anyang-si (KR); Bin Chul Ihm, Anyang-si (KR); Wook Bong Lee, Anyang-si (KR); Jae Won Chang, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 248 days.

(21) Appl. No.: 12/448,692

(22) PCT Filed: Jan. 4, 2008

(86) PCT No.: PCT/KR2008/000045
§ 371 (c)(1),
(2), (4) Date: Oct. 29, 2009

(87) PCT Pub. No.: WO2008/082263
PCT Pub. Date: Jul. 10, 2008

(65) Prior Publication Data
US 2010/0046356 A1 Feb. 25, 2010

(30) Foreign Application Priority Data

Jan. 4, 2007 (KR) .................. 10-2007-0000937

(51) Int. Cl.
*H04W 72/04* (2009.01)
(52) U.S. Cl.
USPC ........... 370/329; 370/208; 370/252; 370/345; 370/335; 375/260; 375/135; 375/141
(58) Field of Classification Search
USPC ........... 370/208, 252, 328, 329; 375/260, 298
See application file for complete search history.

(56) References Cited

U.S. PATENT DOCUMENTS

| | | | |
|---|---|---|---|
| 7,502,310 B2 * | 3/2009 | Hwang et al. | 370/208 |
| 2005/0068931 A1 * | 3/2005 | Cho et al. | 370/345 |
| 2005/0135324 A1 * | 6/2005 | Kim et al. | 370/343 |

(Continued)

FOREIGN PATENT DOCUMENTS

WO WO 2006/130742 A1 7/2006

OTHER PUBLICATIONS

Ericsson: "Uplink Non-Data-Associated Control Signaling" 3GPP TSG-RAN WG1, R1-062867 (Oct. 9, 2006)[retrieved on Nov. 10, 2008].

(Continued)

*Primary Examiner* — Rasheed Gidado
(74) *Attorney, Agent, or Firm* — McKenna Long & Aldridge, LLP

(57) ABSTRACT

Disclosed is a method for multiplexing control signals between a plurality of users when control signals for the plurality of users are allocated within one resource block. That is, a method for multiplexing control signals includes coding control signals for at least one user signals to correspond to a structure of a transmission block for the control signals among one or more dedicated resource block, multiplexing the control signals for the at least one user signals in the dedicated resource block, and transmitting the control signals, wherein the dedicated resource block is allocated for transmitting the control signals separately from data signals among a plurality of transmission resource blocks. A frequency division multiplexing (FDM) mode and a code division multiplexing (CDM) mode are used to multiplex the control signals for the plurality of users.

6 Claims, 11 Drawing Sheets

(56) References Cited

U.S. PATENT DOCUMENTS

| | | | |
|---|---|---|---|
| 2005/0215251 A1* | 9/2005 | Krishnan et al. | 455/434 |
| 2006/0262871 A1* | 11/2006 | Cho et al. | 375/260 |
| 2007/0004465 A1* | 1/2007 | Papasakellariou et al. | 455/571 |
| 2007/0171864 A1* | 7/2007 | Zhang et al. | 370/329 |
| 2007/0242636 A1* | 10/2007 | Kashima et al. | 370/329 |
| 2007/0293233 A1* | 12/2007 | Inoue et al. | 455/450 |
| 2008/0075195 A1* | 3/2008 | Pajukoski et al. | 375/298 |
| 2008/0151829 A1* | 6/2008 | Khandekar et al. | 370/329 |

OTHER PUBLICATIONS

NTT Docomo, et al.: "CDMA-Based Multiplexing Method for Multiple ACK/NACK and CQI in E-UTRA Uplink", 3GPP TSG-RAN WG1, R1-063320 (Nov. 6, 2006)[retrieved on Nov. 10, 2008].

NEC Group: "Reference Signal Multiplexing for Non-Data Associated Control Signal in EUTRA Uplink", 3GPP TSG-RAN WG1, R1-063201(Nov. 6, 2006) [retrieved on Nov. 10, 2008].

Nokia: "Multiplexing of L1/L2 Control Signaling when UE has No Data to Transmit", 3GPP TSG-RAN WG1, R1-062841 (Oct. 9, 2006) [retrieved on Nov. 10, 2008].

Motorola: "E-UTRA Uplink L1/L2 Control Channel Mapping", 3GPP TSG-RAN WG1, R1-063075 (Nov. 6, 2006) [retrieved on Nov. 10, 2008].

Classon, B. et al. "Overview of UMTS Air-Interface Evolution" In: IEEE Vehicular Technology Conference, VTC 2006 Fall, 2006, New York: IEEE, Sep. 2006, pp. 1-5, XP002479511, ISBN1-4244-0062-7, pp. 2-5.

* cited by examiner

FIG. 5
(a)
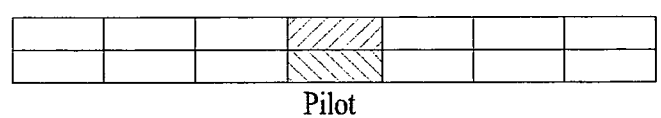
Pilot
(b)
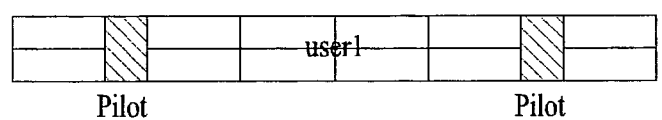
Pilot　　　　　　　Pilot

FIG. 8
(a)
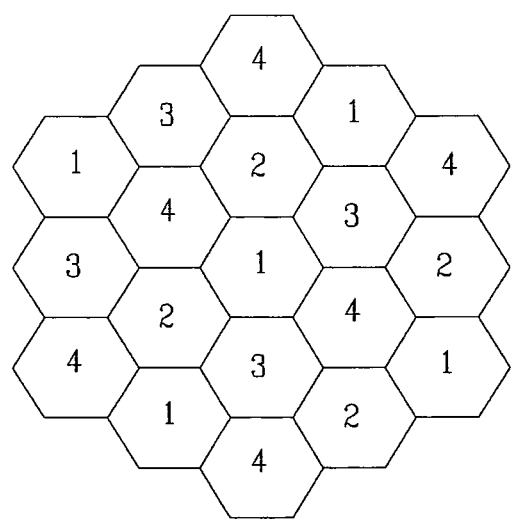
(b)
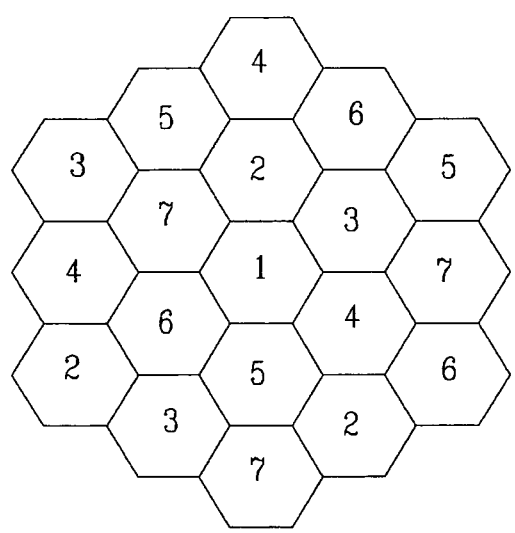

METHOD FOR MULTIPLEXING CONTROL SIGNALS IN A MOBILE COMMUNICATION SYSTEM

This application claims priority to International Application No. PCT/KR2008/000045 filed on Jan. 4, 2008, which claims priority to Korean Patent Application No. 10-2007-0000937 filed on Jan. 4, 2007, the contents of which are hereby incorporated herein by reference for all purposes in their entirety.

TECHNICAL FIELD

The present invention relates to a mobile communication system, and more particularly, to a method for multiplexing control signals in a mobile communication system.

BACKGROUND ART

FIG. 1 illustrates transmission resources used for uplink transmission. Hereinafter, a basic structure of transmission resources used during uplink transmission will be described with reference to FIG. 1.

Uplink transmission is based on an orthogonal frequency division multiplexing access (OFDMA) structure, in which a frequency axis and a time axis are allocated in a certain unit. Referring to FIG. 1, twelve subcarriers are defined as a single resource block (RB), which is a basic allocation unit, on a frequency axis while six long blocks (LB) and two short blocks (SB) are defined as a single transmission time interval (TTI) on a time axis. The SB has a length which is half of that of the LB on the time axis. Also, the SB has the number of subcarriers on the frequency axis, which is half of the number of subcarriers of the LB, and has a subcarrier space which is twice of that of the LB. The SB is generally used for pilot signals (or reference signals).

There may be a case where communication is performed by directly inserting signals generated form sequences to a channel. For example, examples of the sequences include CAZAC (Constant Amplitude Zero AutoCorrelation) sequences, such as GCL (Generalized Chirp Sequence) CAZAC sequence and Zadoff-Chu CAZAC sequence, and gold code. The CAZAC sequences are mainly used in 3GPP, and the gold code is mainly used in WCDMA. Particularly, the CAZAC sequence, which has a certain size suitable for power boosting and has excellent correlation characteristics suitable for synchronization acquisition, will be described below.

Two types are mainly used as the CAZAC sequences, i.e., GCL CAZAC sequence and Zadoff-Chu CAZAC sequence as described above.

First of all, the Zadoff-Chu CAZAC sequence is given as follows.

$$g_p(n) = \begin{cases} e^{-j\frac{2\pi}{M}\frac{1}{2}pn^2} & \text{when } N \text{ is even} \\ e^{-j\frac{2\pi}{M}\frac{1}{2}pn(n+1)} & \text{when } N \text{ is odd,} \end{cases}$$ [Equation 1]

$$n = 0, 1, \ldots, N-1$$

In the above Equation, N is a length of a sequence, and p is a sequence index and has a value of 1 as a common factor with N. This Zadoff-Chu CAZAC sequence satisfies periodic auto-correlation characteristic for a fixed value p. In other words, except that the Zadoff-Chu CAZAC sequence performs correlation for its sequence as it is, the Zadoff-Chu CAZAC sequence always has a correlation value of '0' with a sequence which has undergone cyclic shift. The Zadoff-Chu CAZAC sequence is not orthogonal with a sequence having another p value but has a low cross-correlation value. If N is a prime number, N−1 sequences can be generated, and a cross-correlation value between the generated sequences is $1/\sqrt{M}$.

The GCL CAZAC sequence is given by the Equation 2 as follows.

$$c(n)=g_p(n)b(n \bmod m), n=0,1,\ldots,N-1 \quad \text{[Equation 2]}$$

$g_p(n)$ is ZC sequence having a length of N, and b(n mod m) is an orthogonal modulation sequence such as Hadamard or DFT. The GCL CAZAC sequence has a length which should satisfy $N=sm^2$.

In addition to the above CAZAC sequences, various CAZAC sequences exist.

Generally, although a user uses the entire of one resource block, since the amount of a control signal such as CQI (channel quality information) is not sufficient, the control signal can be allocated for several users within one resource block. Accordingly, a multiplexing method for transmission of a control signal between users is required.

DISCLOSURE OF THE INVENTION

Accordingly, the present invention has been suggested to substantially obviate one or more problems due to limitations and disadvantages of the related art, and an object of the present invention is to provide a mobile communication system of improved performance.

Another object of the present invention is to provide a method for multiplexing control signals between users when a plurality of users transmit control signals for downlink signals as uplink signals.

To achieve these objects and other advantages and in accordance with the purpose of the invention, as embodied and broadly described herein, a method for multiplexing control signals comprises coding control signals for at least one user signals to correspond to a structure of a transmission block for the control signals among one or more dedicated resource block, multiplexing the control signals for the at least one user signals in the dedicated resource block, and transmitting the control signals, wherein the dedicated resource block is allocated for transmitting the control signals separately from data signals among a plurality of transmission resource blocks.

The control signals may be multiplexed by using different subcarriers of the dedicated resource block to each of the control signals.

The control signals may be multiplexed by multiplying by different sequences to each of the control signals.

Pilot signals may be multiplexed in the dedicated resource block.

A structure of transmission blocks for the control signals may be the same as that of a transmission block for the pilot signals, the transmission blocks being included in the dedicated resource block.

The pilot signals may be multiplexed in a same manner with corresponding control signals.

A structure of transmission blocks for the control signals may be different from that of a transmission block for the pilot signals, the transmission blocks being included in the dedicated resource block.

The pilot signals may be multiplexed in a different manner with corresponding control signals.

The pilot signals may be allocated to different transmission blocks for the pilot signals to each of corresponding control signals.

The pilot signals may be a sequence having orthogonality.

The sequence may be a CAZAC (Constant Amplitude Zero AutoCorrelation) sequence.

The pilot signals may be coded by using code having orthogonality.

The code having orthogonality may be at least one of hadamard code and simplex code.

The sequences may be generated through at least one of a method for constituting sequences differently and a method for performing cyclic shift to the sequence.

The sequences constituted differently may be allocated to each cell, and sequences generated by performing cyclic shift to the sequence are allocated to each user of the each cell.

The sequences allocated to neighboring cells may be cyclic shifted with different pattern.

The sequences may be multiplied by the control signals in at least one direction of a time axis and a frequency axis of the dedicated resource block.

A length of the sequences may be determined by the number of subcarriers of the dedicated resource block if the sequences are multiplied by the control signals on a frequency axis.

The control signals may be identified for each user.

The control signals may include at least one of channel quality information (CQI), ACK/NACK signals, rank indicator (RI), and precoding matrix indicator (PMI)

It is to be understood that both the foregoing general description and the following detailed description of the present invention are exemplary and explanatory and are intended to provide further explanation of the invention as claimed.

BRIEF DESCRIPTION OF THE DRAWINGS

FIG. 5 illustrates an example of a method for multiplexing pilot signals;

FIG. 8 illustrates an example of a method for allocating different sequences in a unit of cell;

BEST MODE FOR CARRYING OUT THE INVENTION

Hereinafter, the aforementioned objects, structures, and other features of the present invention will be understood readily by the preferred embodiments of the present invention, examples of which are illustrated in the accompanying drawings. It is intended that the detailed description which will be disclosed along with the accompanying drawings is to illustrate an exemplary embodiment of the present invention not a unique embodiment that can be carried out by the present invention.

If there are no data to be sent to an uplink, a user gathers control signals having no direct relation with uplink data, such as CQI and ACK/NACK, in a certain frequency region and then allocates them. In other words, at least one of a plurality of transmission resource blocks can be allocated as a dedicated resource block for transmitting control signals separately from data signals. For example, a signal for a dedicated resource block is transmitted for two TTIs, and in this case, two resource blocks can be allocated as dedicated resource blocks for transmitting control signals for each of the TTIs. Two dedicated resource blocks, i.e., the first resource block and the last resource block, within one TTI can be allocated dedicatedly for control signals such as CQI.

Uplink transmission is based on an orthogonal frequency division multiplexing access (OFDMA) structure, in which a frequency axis and a time axis are allocated in a certain unit. Hereinafter, a structure of a resource block used in the present invention will be described.

Figure 2:
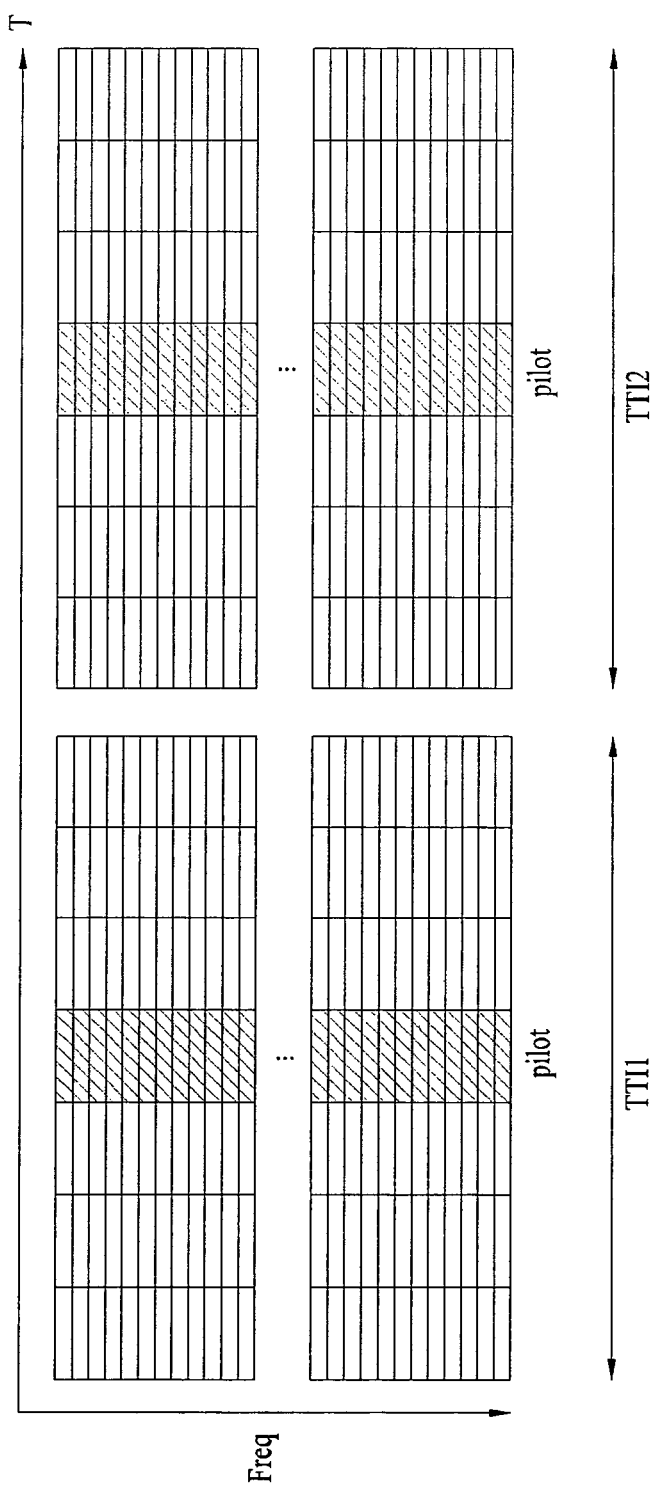
FIG. 2 illustrates transmission resources according to one embodiment of the present invention.

FIG. 2 illustrates an example of a resources block according to one embodiment of the present invention. Referring to FIG. 2, it is noted that a single structure of transmission block included in a resource block is used. Twelve subcarriers are defined as a single resource block (RB), which is a basic allocation unit, on a frequency axis while six transmission blocks for transmitting data and control signals and one transmission block for transmitting pilot signals (or reference signals) are defined as a single transmission time interval (TTI) on a time axis.

The transmission blocks for transmitting data and control signals and the transmission block for transmitting pilot signals have the same structure as each other. In this case, it is advantageous in that the same method as that for coding can be used for scheduling for allocation resources. Hereinafter, for convenience of description, a structure of the aforementioned resource block will be referred to as a resource block structure A.

As another example of resource blocks that can be used, transmission blocks for transmitting data and control signals and a transmission block for transmitting pilot signals have different structures. In other words, twelve subcarriers are defined as a single resource block (RB), which is a basic allocation unit, on a frequency axis while six long blocks (LBs) and two short blocks (SBs) are defined as a single transmission time interval (TTI) on a time axis. The SB has a length which is half of that of the LB on the time axis. Also, the SB has the number of subcarriers on the frequency axis, which is half of that of the LB, and has a subcarrier space which is twice of that of the LB. In this case, for convenience of description, a structure of the blocks will be referred to as a resource block structure B.

As described above, if there are no data to be sent to an uplink, a user allocates some resource block regions to transmit control signals having no direct relation with uplink data, such as CQI and ACK/NACK. For example, among twenty-five resource blocks, the first resource block and the 25$^{th}$ resource block are used for the control signals such as CQI and ACK/NACK.

In other words, a part of a total of transmission resource blocks is set as a dedicated resource block that can be used when a user desires to transmit control signals separately from data transmission. In this case, it is possible to transmit control signals by using the dedicated resource block. When one or more users desire to transmit control signals by using the dedicated resource block, i.e., a single resource block, a multiplexing method will be described below.

First of all, to allocate the control signals for the resource block and transmit them along with subcarriers, a procedure of coding a specific control signal of a digital type is performed. In this case, the coding procedure is preferably performed to correspond to the structure of the resource block.

For example, if the number of transmission blocks (for example, LB) for transmitting data included per TTI corresponding to one subcarrier is six as described above, coding is performed to constitute six symbols (signals) or twelve symbols, which are multiples of 6, to correspond to the number of transmission blocks included per TTI and one subcarrier when the control signals (for example, CQI) are coded. If coding is performed considering the structure of the resource block as above, the control signals can be used more readily during scheduling for resource allocation and sharing for allocated resources. For example, since CQI has five bits, it can be coded as twelve symbols.

Hereinafter, to describe a method for sharing allocated resources among users, i.e., a multiplexing method, it is supposed that among a total of transmission resource blocks, the first resource block and the last resource block, for example, $25^{th}$ resource block in case of a total of 25 resource blocks, are used as the dedicated resource blocks for two TTIs and that the CQI information is transmitted and coding is performed to have twelve symbols. It is also supposed that one kind of CQI information per user is transmitted. However, it should be noted that although it has been described that CQI is used for each user, several kinds of CQI may be used for each user.

Furthermore, under the MIMO environment, CQI to be transmitted increases as much as the number of transmission data streams per user. In this case, considering that users 1, 2, . . . , n are defined as CQI 1, 2, . . . h of user 1, CQI 1, 2, . . . , i . . . , and CQI 1, 2, . . . , j of user n, the following multiplexing method can be used.

Figure 3:
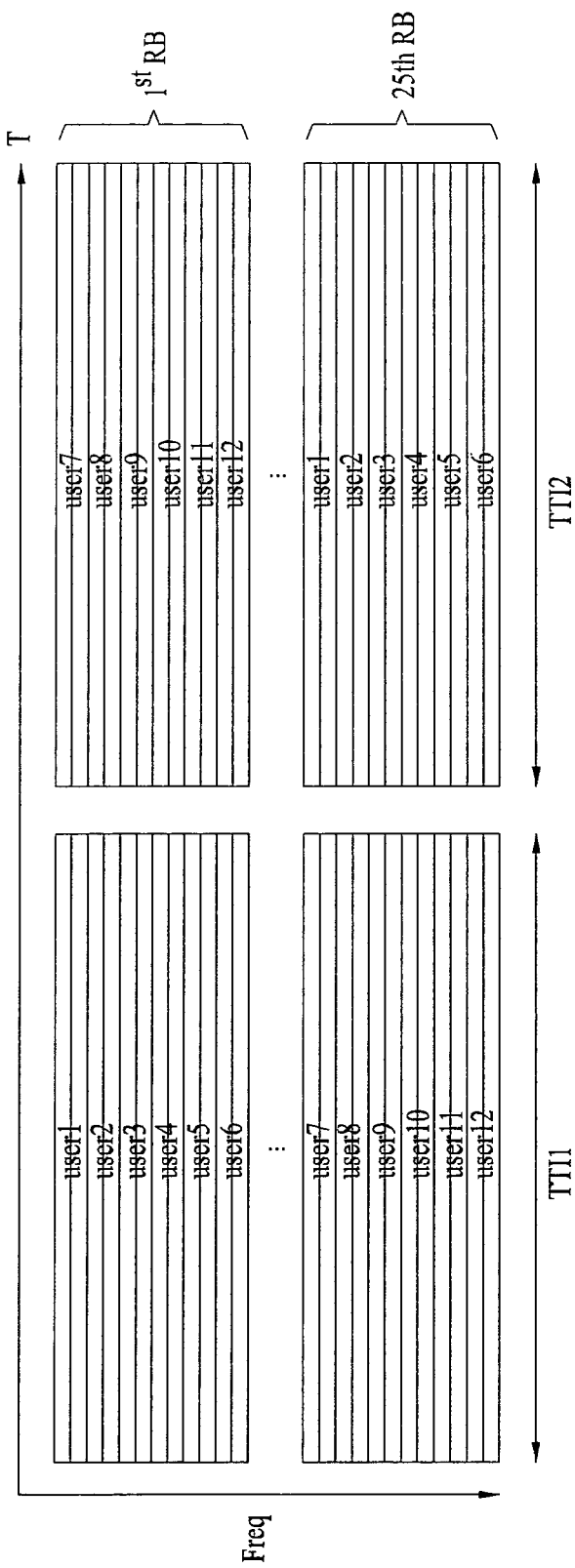
FIG. 3 illustrates one embodiment of the present invention.

FIG. 3 illustrates an example of a multiplexing method for a dedicated resource block. As shown in FIG. 3, the resource block is allocated for each user in a frequency division multiplexing (FDM) mode. In this embodiment, since each user transmits one kind of CQI as supposed above, the resource blocks transmitted through the same dedicated resource block can be identified in a user unit.

To transmit one kind of CQI information, i.e., one kind of CQI coded as twelve symbols, each user may be allocated with transmission blocks equivalent to two subcarriers for a single TTI, i.e., twelve transmission blocks. Alternatively, each user may be allocated with transmission blocks equivalent to four subcarriers, i.e., twenty-four transmission blocks.

A multiplexing method corresponding to the case where each user is allocated with twenty-four transmission blocks is illustrated in FIG. 3.

When allocating a transmission block for each user, the last resource block is allocated to a user, who is allocated with the first resource block for the first TTI, for the second TTI, so as to enhance user diversity within one TTI. And, the first resource block is allocated to a user, who is allocated with the last resource block for the first TTI, for the second TTI. In this case, each user can use a transmission block for pilot transmission within an allocation region regardless of the resource block structure A or the resource block structure B.

In other words, if the resource block structure A is used, since the structure of the transmission blocks for transmitting the control signals is the same as that of the transmission block for transmitting the pilot signals, a separate allocation method for the transmission block for transmitting the pilot signals is not required. Also, if the resource block structure B is used, since the control signals are transmitted by using two successive subcarriers per user in this embodiment, one user can use the transmission blocks for transmitting the pilot signals included in the two subcarriers. Likewise, multiplexing can be performed without any separate allocation method.

It is to be understood that since the multiplexing method illustrated in FIG. 3 is only exemplary, one user may transmit signals by using four neighboring subcarriers with reducing diversity gain.

Alternatively, one user may transmit signals by using four resource blocks, i.e., one subcarrier within each resource block considering diversity gain.

Figure 4:
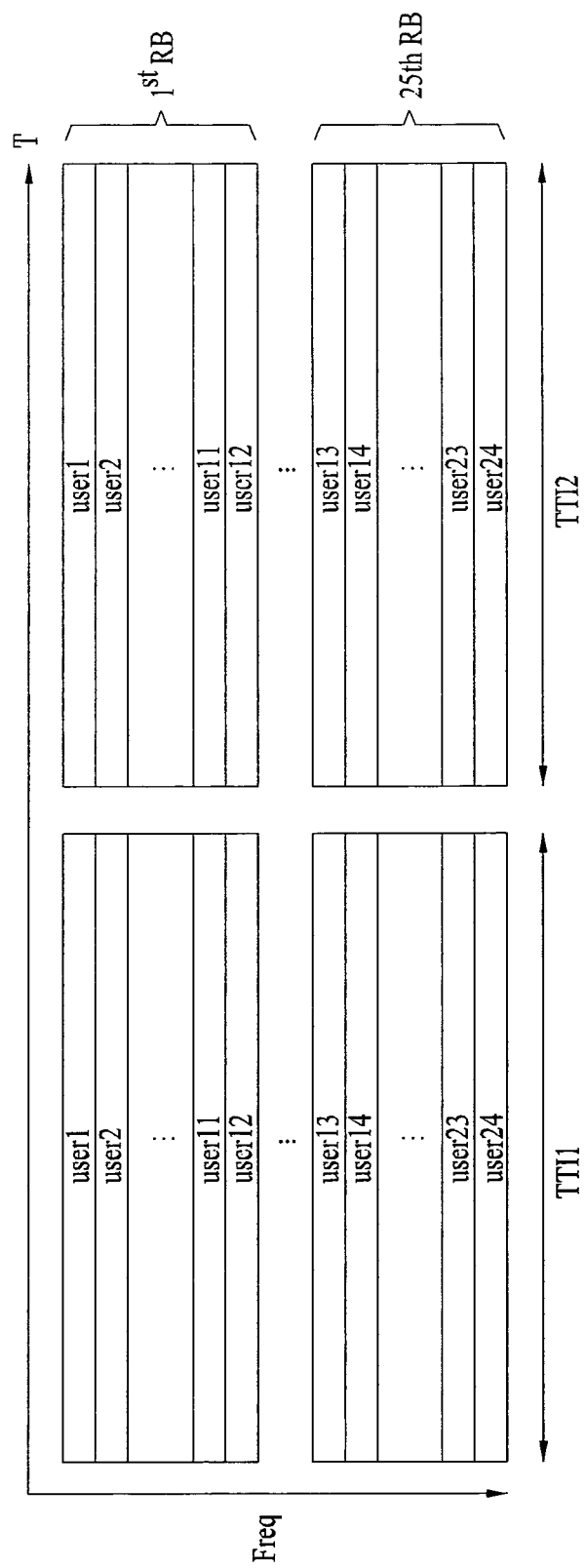
FIG. 4 illustrates another embodiment of the present invention.

FIG. 4 illustrates another example of a multiplexing method for a dedicated resource block. In FIG. 4, twelve transmission blocks are allocated for each of twenty-four users in a frequency division multiplexing (FDM) mode. Referring to FIG. 4, a total of twelve transmission blocks are allocated so that each user can use one subcarrier for two TTIs.

In other words, the transmission blocks are allocated for the first TTI so that each user uses one subcarrier for the first resource block and the last resource block, whereby maximum twenty-four users can transmit the control signals by using the dedicated transmission block. Likewise, one subcarrier is allocated for each user for the second TTI, whereby maximum twenty-four users can transmit the control signals by using the dedicated transmission block.

As a result, the user 1 can transmit the control signals by using the first subcarriers within the first resource block for the first TTI and the second TTI. Likewise, the user 2 can transmit the control signals by using the second subcarriers within the first resource block for the first TTI and the second TTI. In this way, maximum twenty-four users can transmit the control signals through the dedicated resource block.

If the transmission resources for transmitting the control signals are allocated as above, one user uses one subcarrier resource only within each resource block. Accordingly, if the transmission block structure for transmitting the pilot signals is used by using the transmission short block (SB) which corresponds to two times of the transmission long blocks (LB) for transmitting the control signals on the frequency axis like the aforementioned resource block structure B, it is difficult for each user to use the pilot signals of the SB within the allocation region.

FIG. 5 illustrates an example of a method for multiplexing pilot signals. FIG. 5(*a*) illustrates a part of two subcarriers within each resource block of FIG. 2. As shown in FIG. 5(*a*), if the transmission blocks for transmitting the control signals have the same structure as that of the transmission block for transmitting the pilot signals by using the transmission block structure A as shown in FIG. 5(*a*), the plurality of users can equally use the method for allocating resources to transmit the control signals. In other words, each user can use the pilot signals for the allocated subcarrier(s) as they are no matter what the user has been allocated with two successive subcarriers or one subcarrier per resource block.

Even though the transmission block structure A is not used, if each user is allocated with two successive subcarriers within one resource block as shown in FIG. 5(*b*), each user can use the pilot signals for the subcarrier allocated as shown in FIG. 5(*a*).

Figure 1:
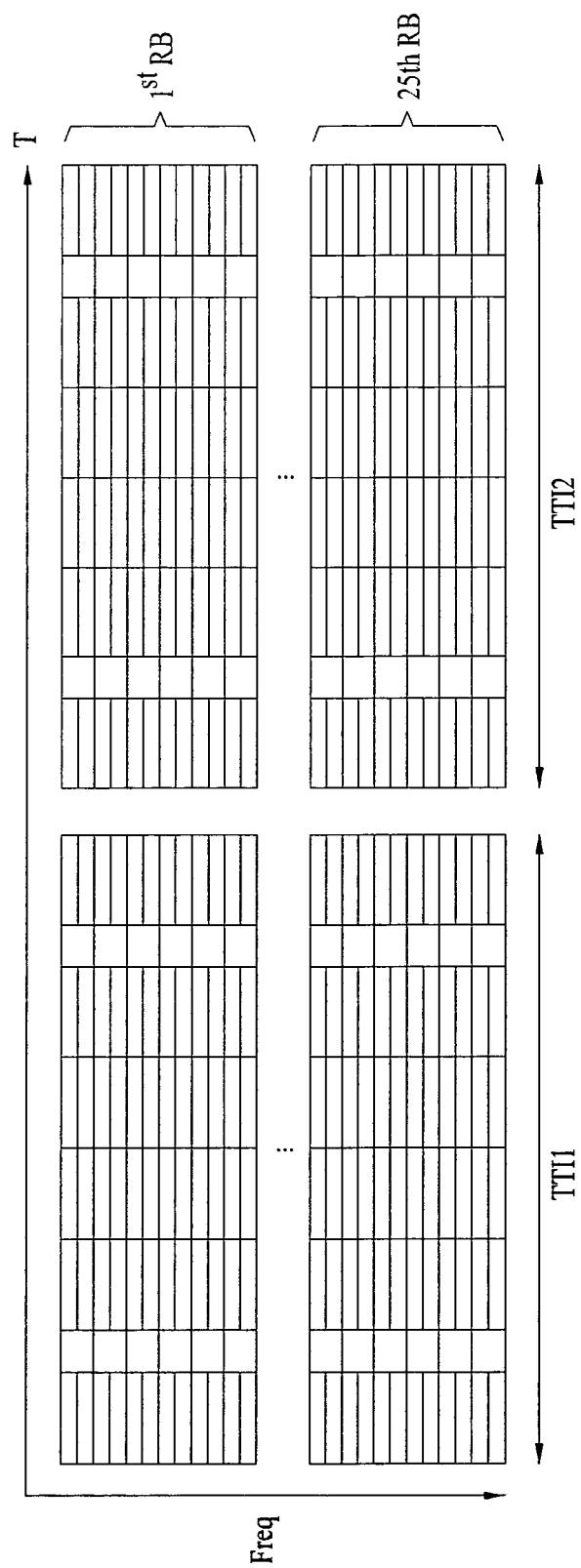
FIG. 1 illustrates transmission resources used for uplink transmission.

In case of the resource block structure as shown in FIG. 1 and FIG. 2 or FIG. 5(*a*) and FIG. 5(*b*), the respective users may be allocated with different CAZAC sequences to identify the pilot signals. In other words, even though the control signals are multiplexed using the FDM mode, the pilot signals are multiplexed in a CDM mode.

For example, a plurality of users may use the entire or a part of the pilot signals included in the resource block and multiply CAZAC sequences allocated for each user by the pilot signals to identify the pilot signals.

The length of the CAZAC sequence may depend on how many resource blocks one user uses for pilot signal transmission. In other words, if one user uses the pilot signals for one resource block, the CAZAC sequences having a length of 12 can be used. And, if one user uses the pilot signals for two resource blocks, the CAZAC sequences having a length of 24 can be used.

When the structure of the transmission block for transmitting the pilot signals is different from that of the transmission blocks for transmitting the control signals like the resource block structure B, a separate method for multiplexing the pilot signals is required. This will be described with reference to FIG. 6.

Figure 6:
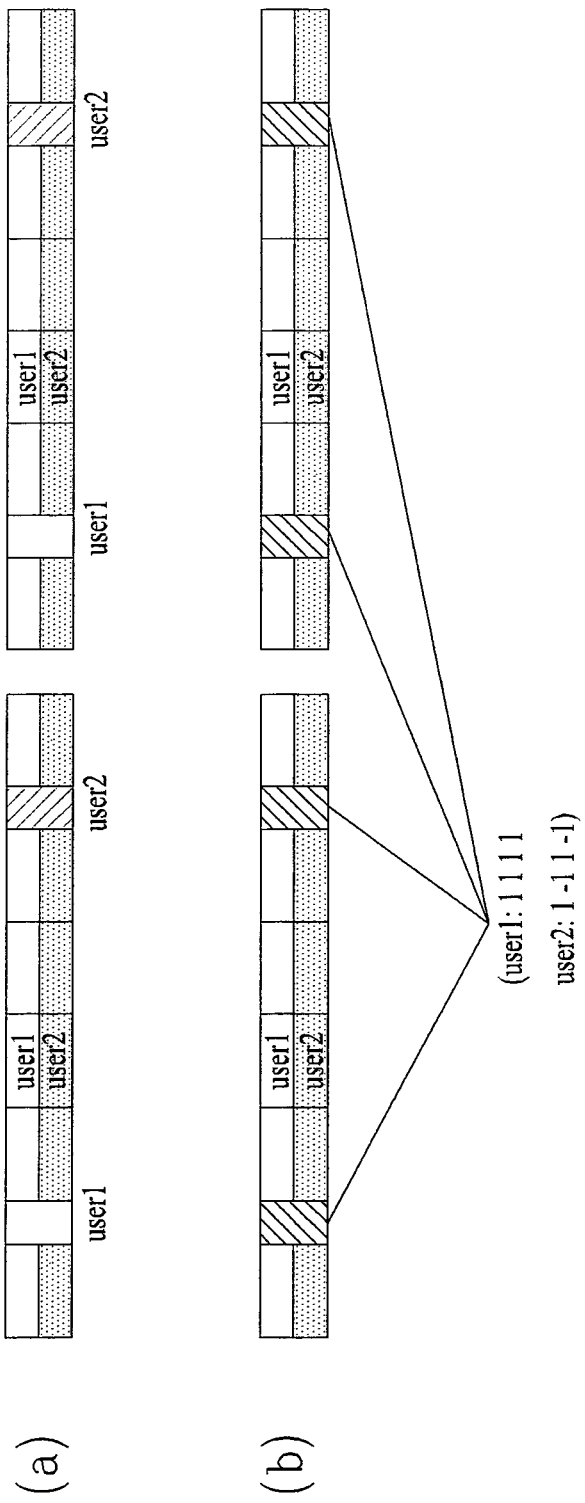
FIG. 6 illustrates another example of a method for multiplexing pilot signals.

FIG. 6 illustrates another example of a method for multiplexing pilot signals. FIG. 6 illustrates the aforementioned resource block structure B and a method for allocating pilot signals for each user if one user is allocated with one subcarrier within one resource block.

As described above, if the structure of the LB is different from that of the SB, each user fails to use one pilot signal well unlike FIG. 5 illustrates that the pilot signals between two users are separated from each other on the frequency axis, i.e., subcarriers of each user are separated from each other to transmit the control signals.

FIG. 6(a) illustrates a method for using a different transmission short block for transmitting pilot signals for each user. Referring to FIG. 6(a), it is noted that the transmission short block for transmitting two pilot signals may be included for one TTI, and two users can use subcarriers for one pilot signal. In this case, the respective users who can receive the pilot signals in accordance with allocation of the control signals are allocated with different pilot signals. In other words, each user can alternately use the pilot signals so as not to use a common transmission block (disjoint method).

FIG. 6(b) illustrates another example of a method for allocating pilot signals, wherein the respective user use different pilot signals which are orthogonal to each other. In other words, the control signals of some users (for example, CQI of user 1 and CQI of user 2) are used for the same SB but pilot signals are used to maintain orthogonality for each user. Accordingly, the signals having orthogonality for the same SB are used as the pilot signals to identify the signals.

As for an example of the signals having orthogonality, user 1 transmits the pilot signals corresponding to 1, 1, 1, 1 for four pilot signal transmission blocks while user 2 transmits pilot signals corresponding to 1, −1, 1, −1 for four pilot signal transmission blocks. It is to be understood that the signals having orthogonality are only exemplary, and Hadamard code and Simplex code may be used.

Even in case that Hadamard code and Simplex code are used, as described above, a plurality of users can use the same transmission block for transmitting the pilot signals but may be allocated with CAZAC sequences having orthogonality to identify the pilot signals.

Figure 7:
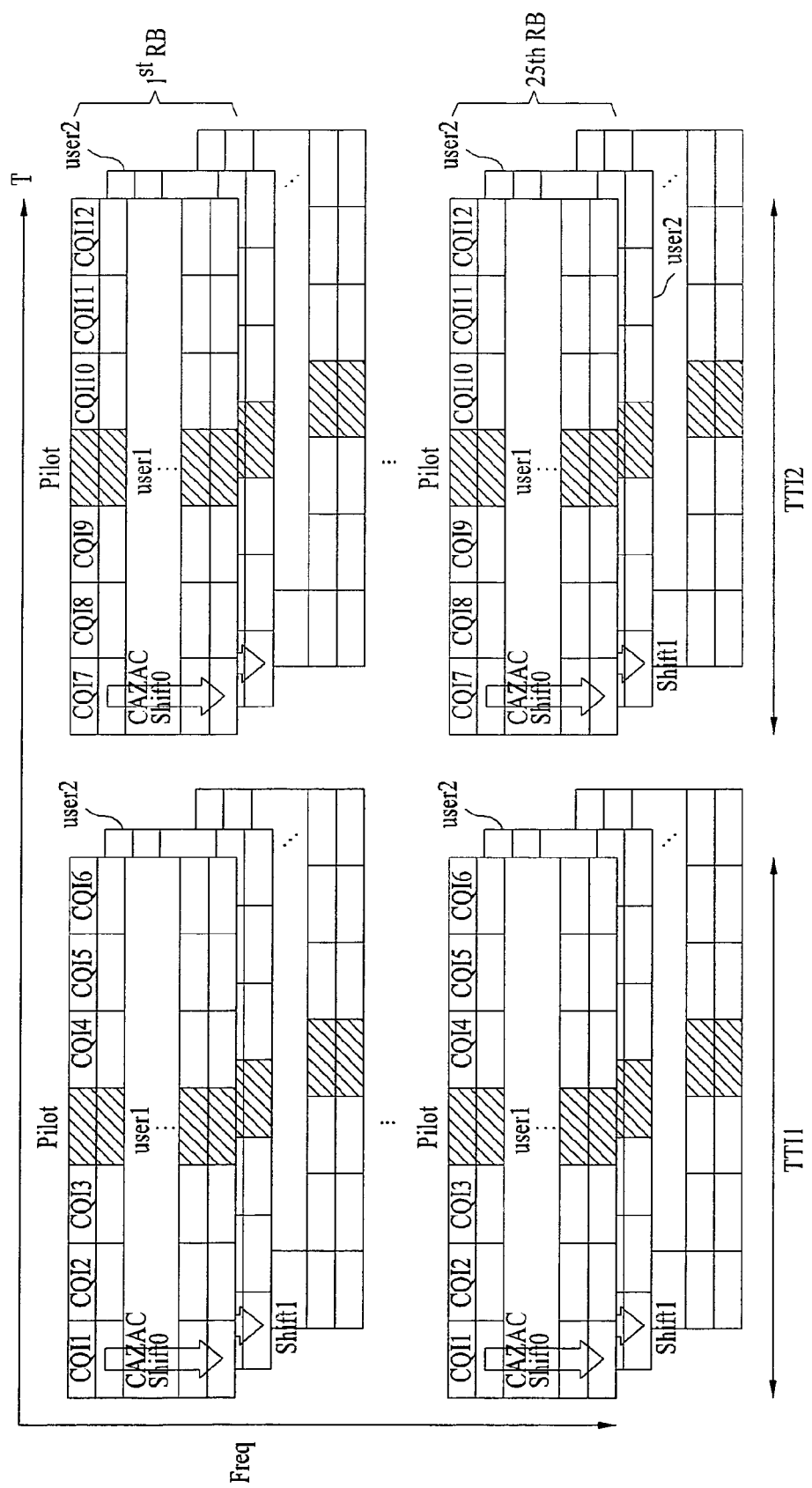
FIG. 7 illustrates still another embodiment of the present invention.

FIG. 7 illustrates another embodiment of the present invention. Hereinafter, a method for multiplexing control signals for a plurality of users by designating a dedicated transmission block for transmitting the control signals and using a code division multiplexing (CDM) mode will be described with reference to FIG. 7.

Different users can commonly use a total of regions or some regions, which are allocated dedicatedly for control signals (for example, CQI), in a CDM mode. In other words, according to the multiplexing method, a plurality of users use the same transmission resource, and a code which can identify each user from the other users is allocated to each user and multiplied by the transmission signal.

As an example of a code which is allocated to each user to identify each user, CAZAC sequence can be used. Hereinafter, a multiplexing method using CAZAC sequence will be described with reference to an example of transmitting CQI coded as a total of twelve symbols.

A plurality of users can use all of corresponding dedicated resource blocks. In other words, CQI of each user is carried in the first subcarrier for two TTIs, and CQI signal of each user is repeatedly carried in the other subcarriers. Then, CAZAC sequence is carried for each signal. This means that the CAZAC sequence is transmitted in such a manner that a signal carried in a corresponding resource is multiplied by a value corresponding to the CAZAC sequence.

The CAZAC sequence may be transmitted by being multiplied by a corresponding sequence on a time axis or a frequency axis. For example, if the CAZAC sequence is transmitted by being multiplied by a corresponding sequence on a time axis, after an OFDM system performs IFFT, the CAZAC sequence is multiplied by the signal which has undergone IFFT and then applied on the time axis. For another example, SC-FDMA system performs DFT in a step prior to the OFDM system. In this case, if the CAZAC sequence is multiplied by the signal prior to performing the DFT, it may be regarded as being applied on the time axis. FIG. 7 illustrates a case where the CAZAC sequence is multiplied by the signal on the frequency axis.

In other words, although a plurality of users transmits the same transmission resource of the same transmission block, a code (for example, CAZAC sequence) is allocated to each user to identify a plurality of user signals from one another. An example of two resource blocks (for example, first resource block and $25^{th}$ resource block) designated in one TTI as transmission blocks for transmitting the control signals for two TTIs like the FDM mode will be described.

As shown in FIG. 7, CQI information of user 1 is transmitted by using the first resource block for two TTIs. And, the first resource block information is repeatedly transmitted through the $25^{th}$ resource block. The CAZAC sequence having a length of 12 allocated to user 1 is multiplied by each resource block on the frequency axis and then transmitted. The user 2 transmits CQI information in the same manner as the user 1 but uses the CAZAC sequence having a length of 12 allocated to the user 2. Supposing that twelve sequences having orthogonality for the CAZAC sequence having a length of 12 can be generated, at least twelve users can use the same transmission blocks.

As another example, there is provided a method for allocating the first resource block and the $25^{th}$ resource block to different users. In other words, CQI information of the user 1 is transmitted by using the first resource block for two TTIs, and is multiplied by the CAZAC sequence having a length of 12 allocated to the user 1 on the frequency axis. The first resource block information is not repeated through the $25^{th}$ resource block but CQI information of the user 2 is transmitted.

Likewise, the CAZAC sequence having a length of 12 is multiplied on the frequency axis and then transmitted, wherein the CAZAC sequence having a length of 12 allocated to the user 2 is used. In this case, users twice more than those in the above method can use the CAZAC sequence. In other words, supposing that twelve sequences having orthogonality can be generated for the CAZAC sequence having a length of 12, at least twenty-four users can use the CAZAC sequence.

As another example, there is provided a method for using the CAZAC sequence for two resource blocks. In this case, as the length of the sequence becomes long, the number of sequences that can be generated to maintain orthogonality increases, whereby the number of users to which the sequences can be allocated may increase. In other words, if CAZAC sequence having a length of 24 is used for example, supposing that twenty-two sequences having orthogonality can be generated for the CAZAC sequence having a length of 24, at least twenty-two users can use the sequences.

If the CAZAC sequence is used as a code that can identify a plurality of users who use the same transmission resource, a method for generating a plurality of codes having orthogonality in accordance with characteristics of the CAZAC sequence will be described.

First of all, different CAZAC sequences can be used for each user to identify each user from the other users. Alternatively, cyclic shift may be performed for the same CAZAC sequence in a predetermined unit by using characteristics of the CAZAC sequence to generate sequences having orthogonality, thereby identifying each user from the other users. As an example of using the CAZAC sequence which has undergone the cyclic shift, different CAZAC sequences may be used for each cell, and the CAZAC sequence which has undergone the cyclic shift may be used for each user included in each cell. In such case, it is possible to reduce interference from neighboring cells by using different CAZAC sequences per neighboring cell.

Also, it is advantageous in that more various kinds of sequences can be generated against limitation in the number of users to which different sequences can be allocated. The limitation in the number of users is caused as the number of different CAZAC sequences that can be generated is limited in comparison with the case where different CAZAC sequences for each user are used.

Hereinafter, the case where different CAZAC sequences are used for each cell and each user is identified from the other users by using the sequences which have undergone cyclic shift will be described in detail. The aforementioned ZC sequence and GCL CAZAC sequence can be used as the CAZAC sequence.

Preferably, the length of the sequences finally determined to correspond to the number of subcarriers included in one resource block is 12. As an example of constituting the CAZAC sequence having a length of 12, there is provided a method of constituting a sequence having a length of 12 when first constituting a sequence. In other words, if the sequence having a length of 12 is used, the number of different sequences is 4 (p=1, 5, 7, 11).

In this case, since cyclic shift can be performed until 12, the sequences can simultaneously be allocated to twelve users. The sequences may be used to repeatedly allocate information, which is allocated to the first resource block, to the last resource block, or may be allocated to transmit control signals of different users, i.e., CQI information.

In such case, control information of maximum twenty-four users can be allocated. Much more CAZAC sequences can be generated in view of their characteristics when they have a length of a prime number.

Accordingly, as another example of constituting CAZAC sequences having a length of 12, the CAZAC sequences having a length of 12 can be generated in such a manner that CAZAC sequences having a length of 11 are generated and then one bit is added thereto. For example, the sequences having a length of 12 can be generated by zero padding of the twelfth one of the generated sequences having a length of 11 to "0."

For another example, the sequences having a length of 12 can be generated in such a manner that CAZAC sequences having a length of 13 are generated and then one bit is cut from the generated sequences having a length of 13. For example, the sequences can be used by puncturing the thirteenth bit to the generated sequences having a length of 13.

The aforementioned method relates to a method of multiplying one resource block by the CAZAC sequences. If there are two dedicated resource blocks per TTI, a method of simultaneously multiplying the two resource blocks by the CAZAC sequences may be used. In other words, if the first resource block and the last resource block are designated as dedicated resource blocks for transmitting the control signals, a total of twenty-four subcarriers for the two dedicated resource blocks can be used simultaneously in a CDM mode.

In this case, sequences having a length of 24 can be generated in such a manner that eight different sequences having a length of 24 are generated or twenty-two different sequences having a length of 23 are generated and then one bit is added thereto. In this case, zero padding of "0" to the last sequence can be used in the same manner as above. As a result, since much more different CAZAC sequences can be generated by using the long sequences, it is advantageous in that different sequences can be allocated to a cell corresponding to at least 1 tier.

FIG. 8 illustrates a method for allocating different sequences in a cell unit.

FIG. 8(a) illustrates an example of a method for allocating four different sequences in a cell unit if four different sequences can be generated by constituting sequences having a length of 12 in accordance with the aforementioned method of generating sequences.

FIG. 8(b) illustrates an example of a method for allocating at least seven different sequences if at least seven different sequences can be generated by constituting sequences having a length of 12 or 24 in accordance with another example of the aforementioned method of generating sequences. If much more sequences can be generated by the method of generating sequences having a length of a prime number, since different sequences can be allocated to cells located in at least 1 tier, it is possible to reduce interference.

If the CAZAC sequences are used, both a non-coherent method and a coherent method which correspond to demodulation methods can be used. If the non-coherent method is used, it is preferable that pilot signals are transmitted. As described above with reference to the FDM mode, if the structure of the transmission block for transmitting the pilot signals is the same as that of the transmission blocks for transmitting the control signals, i.e., if the resource block structure A is used, the multiplexing method used for the control signals can be used. In other words, if the CDM mode according to one embodiment of the present invention is used, the CDM mode between users for the pilot signals can be implemented by applying the sequences applied for the control signals to transmission of the pilot signals. However, if the resource block structure B is used as described above, it is preferable to consider another multiplexing method.

Hereinafter, examples of a method for multiplexing the pilot signals when the resource block structure B is used will be described. For example, if the CAZAC sequences having a length of 12 have been used for CQI, CAZAC sequences having a length of 6 are constituted and applied for the pilot signals. For another example, the CAZAC sequences allocated to the control signals can be used for all pilot signals included in one resource block corresponding to the first and second SBs. In other words, if the CAZAC sequences having a length of 12 have been applied for the control signals, since the total number of pilot signals for all SBs belonging to one resource block is 12, the same CAZAC sequences as those applied to the control signals having a length of 12 can be applied to the pilot signals. In this case, it is advantageous in that new CAZAC sequences for the pilot signals are not required.

Figure 9:
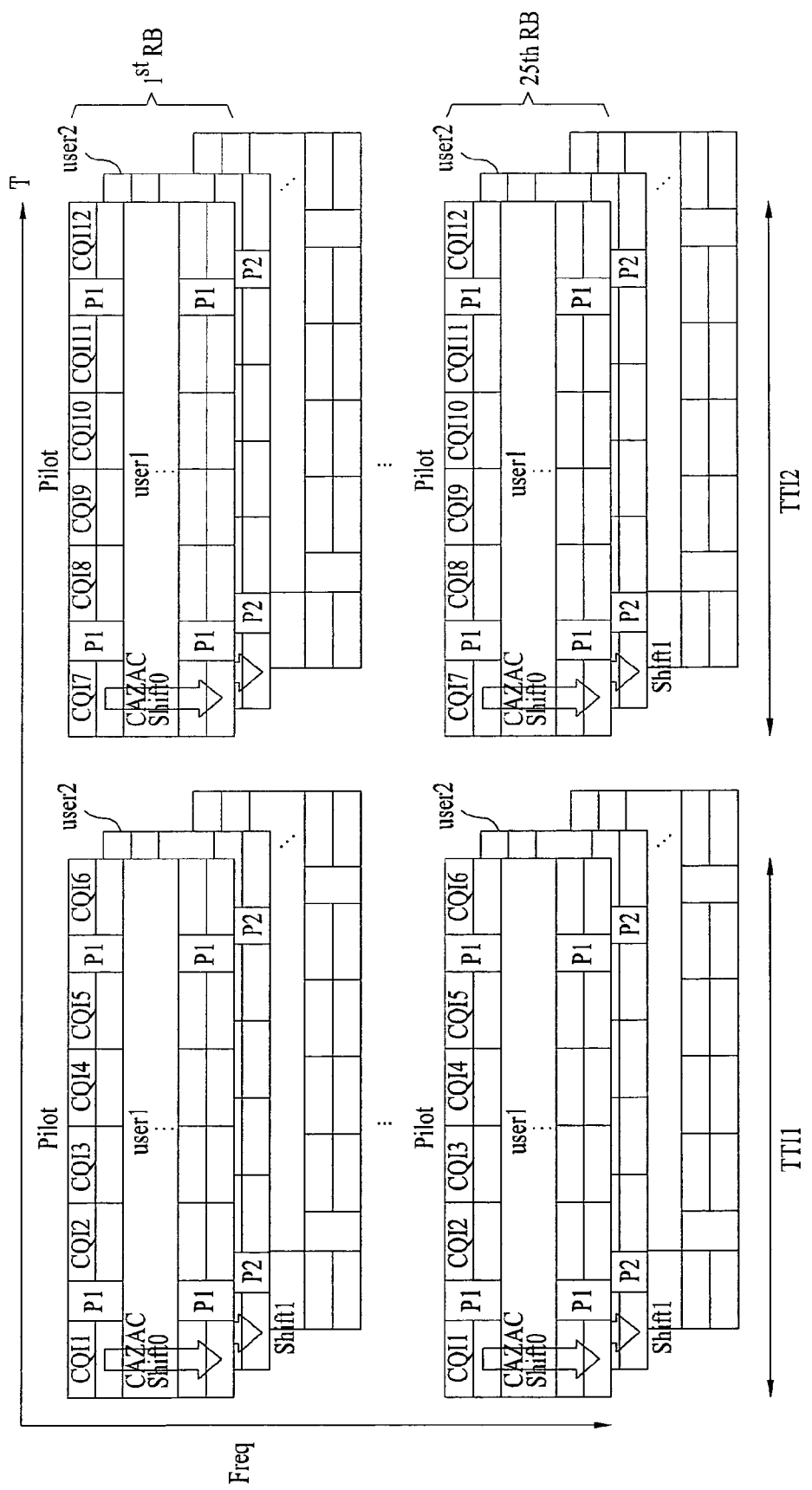
FIG. 9 illustrates other example of a method for multiplexing pilot signals.
Figure 10:
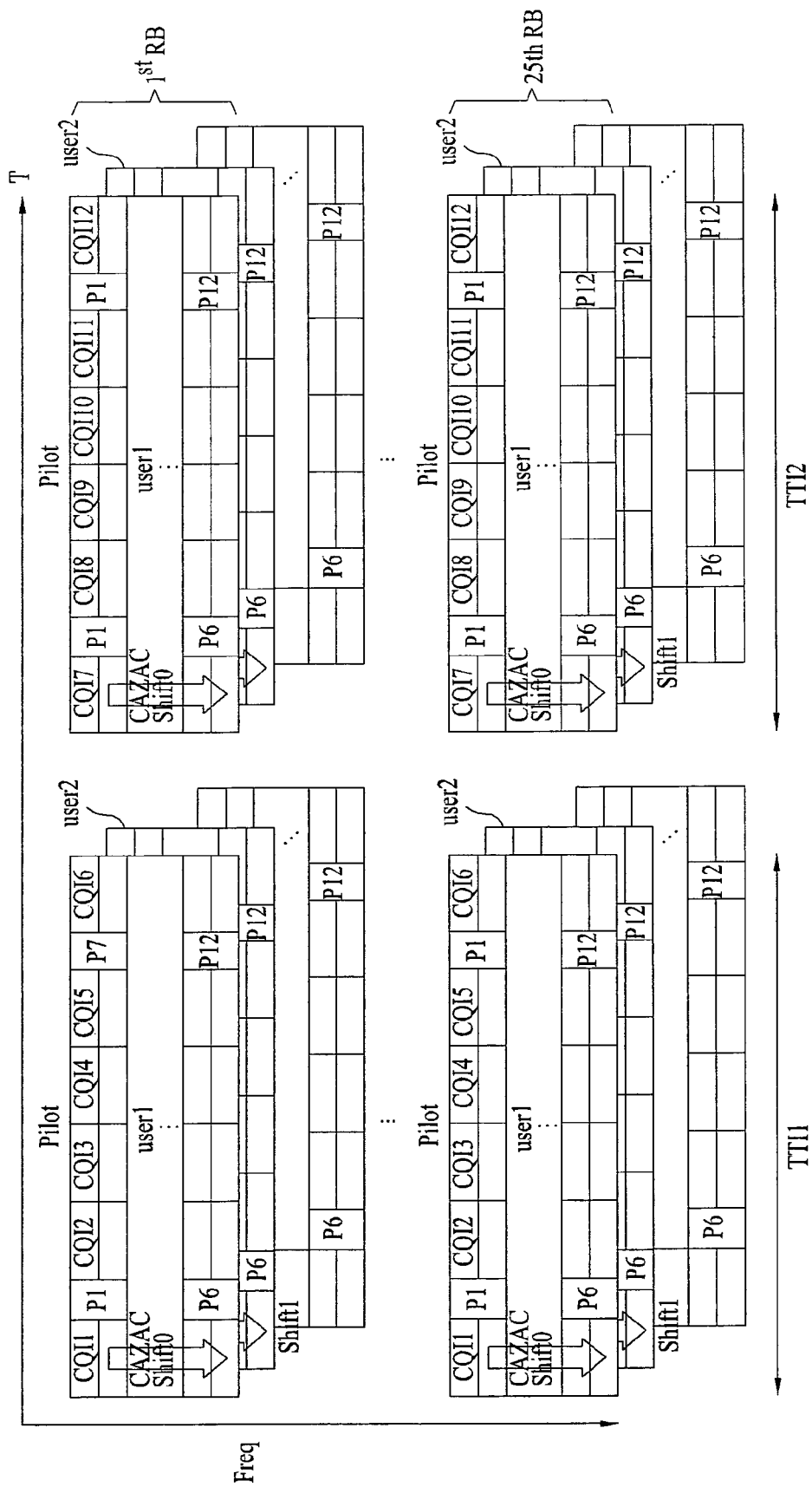
FIG. 10 illustrates other example of a method for multiplexing pilot signals.

FIG. 9 and FIG. 10 illustrate another example of a method for multiplexing pilot signals. FIG. 9 and FIG. 10 illustrate a dedicated resource block, which is allocated in the same manner as FIG. 7, but illustrates a multiplexing method unlike that of FIG. 7, wherein the multiplexing method corresponds to the case where the structure of the resource blocks for transmitting control signals is the same as that of the resource block for transmitting pilot signals, i.e., the case where the resource block structure B is used. Pn (n=1, 2, ... , 12) illustrated in FIG. 9 and FIG. 10 illustrate pilot signals for each user n.

Referring to FIG. 9, one user uses all pilot signals included in the dedicated resource block like the control signals, and CAZAC sequences are used to identify users. In this case, sequences having a length of 6 may be used separately from CQI. Also, CAZAC sequences having a length of 12 may be used for all pilot signals included in one resource block. In this case, it is advantageous in that separate CAZAC sequences for pilot signals are not required.

Referring to FIG. 10, as another example of multiplexing pilot signals, different SBs may be used for each user like the structure for transmitting pilot signals in the aforementioned FDM mode. In this case, the example described in the aforementioned FDM mode may be used or pilot signals may be distributed to measure a channel of an entire interval more exactly. Referring to FIG. 10, pilot signals for a total of twelve users are transmitted, and one SB is allocated to each user. Accordingly, a total of twelve users can use different SBs so as to implement multiplexing in transmitting pilot signals.

As another method, some users, for example, two users use the same transmission block for transmitting pilot signals, and a code having orthogonality can be allocated to each user to identify each user from another user. Alternatively, each pilot signal may be transmitted by coding using the code having orthogonality for each of users who use one resource block together. Examples of sequences having orthogonality include Hadamard code and Simplex code.

Figure 11:
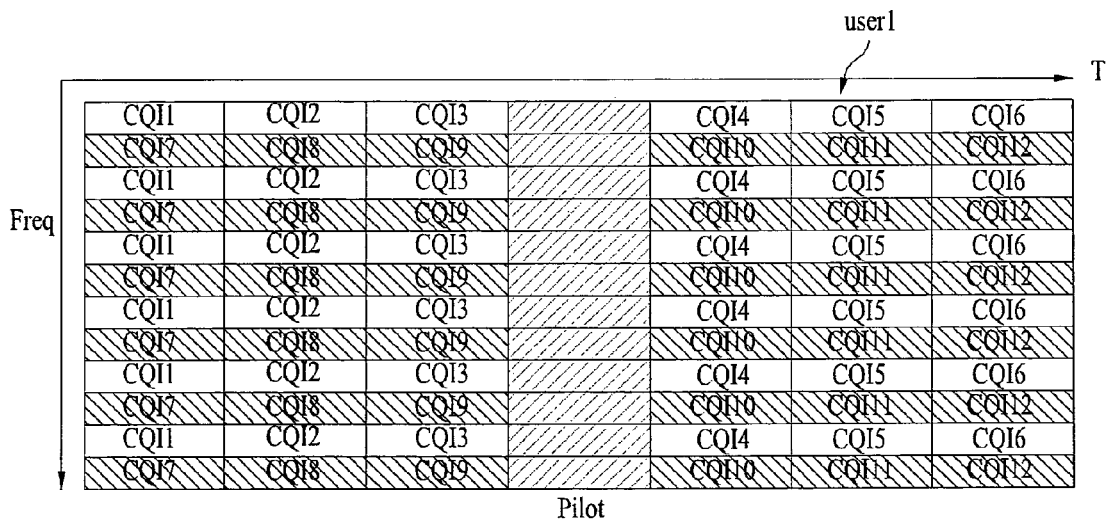
FIG. 11 illustrates further still another embodiment of the present invention.

FIG. 11 illustrates another embodiment of the present invention. It is supposed that a multiplexing method illustrated in FIG. 11 is based on a CDM mode, and that the resource block structure A is used, in which the transmission block for transmitting pilot signals is the same as the transmission blocks for transmitting control signals. It is also supposed that one kind of CQI information which is coded in a type of twelve symbols is used. Unlike the case where twelve symbols for CQI information are transmitted by using two resource blocks, the twelve symbols can be transmitted by using one resource block.

For example, first six symbols are allocated to a first subcarrier included in a corresponding dedicated resource block and the other six symbols are allocated to a second subcarrier. As for the other ten subcarriers, the first six symbols are repeatedly allocated to the odd numbered subcarriers and the other six symbols are repeatedly allocated to the even numbered subcarriers. CQI information of corresponding users is allocated equally. Different codes are allocated to respective users to perform multiplexing.

At this time, the even numbered subcarriers and the odd numbered subcarriers are respectively multiplied by the sequences. In other words, as shown in FIG. 11, twelve CQI symbols are carried in two subcarrier intervals, and CAZAC sequences having a length of 6 are applied to each CQI symbol. For example, the user 1 uses CAZAC sequences (cyclic shift=0) having a length of 6, which have not undergone cyclic shift and have been allocated to its cell.

The first CQI symbol is allocated to an odd numbered subcarrier region among transmission blocks corresponding to a first column within the first TTI, and is multiplied by the CAZAC sequences having a length of 6, which have not undergone cyclic shift, for signal transmission. Likewise, the seventh CQI symbol is allocated to an even numbered subcarrier region among the transmission blocks corresponding to the first column within the first TTI, and is multiplied by the same CAZAC signal for signal transmission. The second CQI symbol and the eighth CQI symbol are divided into odd/even numbered symbols and then repeatedly allocated to transmission blocks corresponding to the second column.

These CQI symbols are multiplied by the CAZAC sequences for the user 1 and then transmitted. In this way, CQI signals consisting of a total of twelve symbols of the user 1 can be transmitted by being multiplexed in the CDM mode. At this time, another user who transmits control signals, etc. through the same dedicated resource block as that of the user 1 can apply the aforementioned method with sequences which are generated by performing cyclic shift for CAZAC sequences different from its CQI information or the same CAZAC sequences as those of the user 1 at its unique cyclic shift value.

Since the resource block structure A used in the embodiment of FIG. 11 is constituted such that the transmission block for transmitting pilot signals has the same structure as that of the transmission blocks for transmitting control signals, the multiplexing method can equally be applied to the pilot signals and the control signals.

Figure 12:
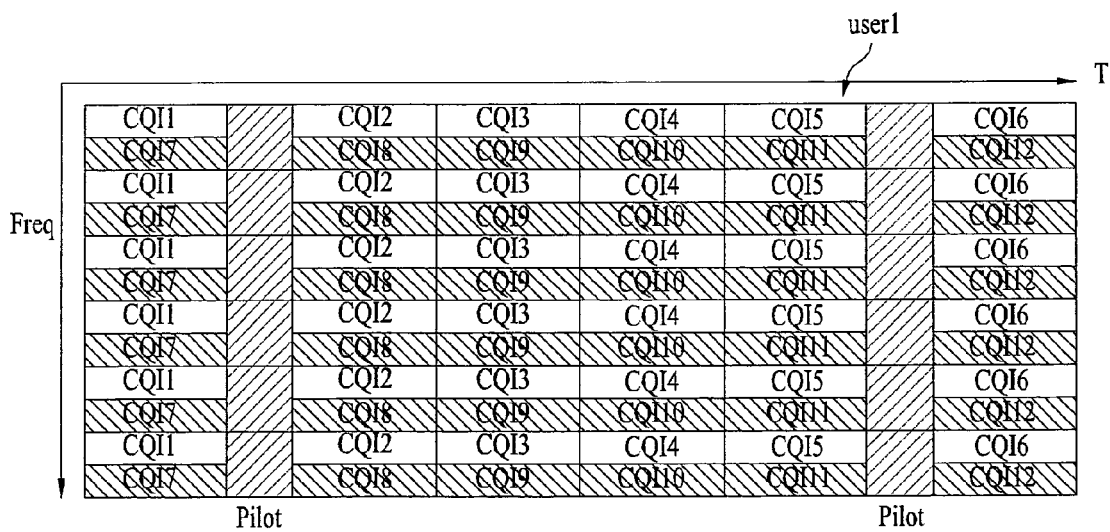
FIG. 12 illustrates further still another embodiment of the present invention.

FIG. 12 illustrates another embodiment of the present invention. A multiplexing method illustrated in FIG. 12 relates to the case where the CDM is used but the resource block structure B is used, in which the transmission block for transmitting pilot signals has a structure different from that of the transmission blocks for transmitting control signals. It is supposed that one kind of CQI information is coded in a type of twelve symbols.

Referring to FIG. 12, since six transmission blocks (LB) for transmitting control signals are provided per subcarrier within one resource block, like the method described with reference to FIG. 11, the twelve CQI symbols are allocated to two subcarrier interval and CAZAC sequences having a length of 6 are applied to each of the CQI symbols. For example, it is supposed that the user 1 uses CAZAC sequences (cyclic shift=0) having a length of 6, which have not undergone cyclic shift and have been allocated to its cell. The CAZAC sequences having a length of 6 allocated to the user 1 are used for six odd numbered subcarriers among a total of twelve subcarriers. Likewise, the CAZAC sequences allocated to the user 1 are used for six even numbered subcarriers.

As described above, the method for allocating control signals is the same as that described with reference to FIG. 11. However, as will be aware of it from FIG. 12, since the structure of the transmission block (SB) for transmitting pilot signals is different from that of the transmission blocks (LB) for transmitting control signals, i.e., CQI signals, separate sequences may be required for the SB.

In this case, it is advantageous in that the same CAZAC sequences as those used for the control signals may be used for the pilot signals. In other words, a total of twelve CQI symbols are allocated to two successive subcarriers within one TTI, so that the sequences used for the control signals, i.e., CQI signals can equally be applied to the pilot signals even in case that the resource block structure B in which one pilot signal is transmitted through two subcarriers is used.

For example, unique CAZAC sequences having a length of 6 for the user 1 or CAZAC sequences which have undergone cyclic shift can be applied to the pilot signals of the user 1 as shown in FIG. 11, whereby the CDM mode, to which the control signals and the pilot signals can equally be applied, can be implemented.

In this case, in case of the CAZAC sequences having a length of 6, the CAZAC sequences can be used in such a manner that CAZAC sequences having a length of 6 may directly be generated or CAZAC sequences having a length of 7 corresponding to a prime number may initially be generated and then one bit may be excluded from the generated sequences. In other words, the CAZAC sequences having a length of 6 can be used in such a manner that puncturing may be performed for information corresponding to the last bit for the CAZAC sequences having a length of 7.

The case where CQI information is transmitted as an example of control signals has been described as above. Examples of the control signals include CQI information and other control signals. For example, in addition to CQI, ACK/NACK signals, rank indicator (RI) information in the MIMO system and precoding matrix indicator (PMI) information may be included in the control signals. The multiplexing method of CQI and pilot signals corresponding to the CQI can equally be applied to transmission of all control signals transmitted through the dedicated resource block.

For example, the method for allocating ACK/NACK signals can be applied in the almost same manner as that of CQI. Coding of CQI information of 5 bits as twelve symbols has been described as an example of a coding method corresponding to the structure of the resource block. Likewise, ACK/NACK signals may be coded as twelve symbols. Also, considering features of the ACK/NACK signals, the ACK/NACK signals may be coded to have a smaller number of symbols. For example, ACK/NACK signals of 1 bit or 2 bits may be used. At this time, if the ACK/NACK signals are coded as twelve symbols like CQI, relatively great overhead may occur. Accordingly, coding is performed to have a smaller number of symbols considering the structure of the resource block as described above.

For example, since the number of transmission blocks that can be transmitted per subcarrier within one resource block is 6, coding may be performed to have six symbols. In this case, since resources to be allocated to each user can be reduced to half as compared with all the aforementioned methods described with respect to allocation of CQI, users increased by two times can be allocated to obtain six symbols of the ACK/NACK signals.

In case of the same number of users, one resource block can be used as a dedicated resource block as compared with the case where two resource blocks per TTI are designated as dedicated resource blocks for transmitting control signals. Also, even in case that two resource blocks per TTI are used as dedicated resource blocks, the same number of users can be applied for one TTI. In other words, the FDM mode of FIG. 3 is applied for one TTI. For example, in FIG. 7, the CDM mode is applied for one TTI.

In other words, a total of six ACK/NACK signals of the user 1, i.e., ACK/NACK1, ACK/NACK2, ACK/NACK3, ACK/NACK4, ACK/NACK5, and ACK/NACK6, are respectively allocated to the transmission blocks included in the first subcarrier, and the CAZAC sequences allocated to the user 1 are applied to the ACK/NACK signals. The other method for allocating pilot signals can be used equally or similarly to the case of CQI with reference to the case of CQI.

If there are provided two ACK/NACK signals to be transmitted by the user, these ACK/NACK signals are alternately allocated to the even/odd numbered subcarriers described with reference to FIG. 10 and FIG. 11. The sequences having a length of 6 can be used for the odd numbered subcarriers while the same sequences can be used for the even numbered subcarriers.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

According to the present invention, a plurality of users can transmit control signals through the same resource. Also, an efficient multiplexing transmission method can be performed.

What is claimed is:

1. A method for transmitting control signals at a mobile station (MS) in a wireless communication system, the method comprising:
   transmitting pilot signals generated by using a code sequence via two or more resource blocks in a frequency domain at first single carrier frequency division multiplexing access (SC-FDMA) symbols located in a middle of each of consecutive time domain units; and
   transmitting the control signals via the two or more resource blocks in the frequency domain at second SC-FDMA symbols other than the first SC-FDMA symbols within the consecutive time domain units,
   wherein the two or more resource blocks are dedicated to transmission of the control signals without transmission of data traffic,
   wherein the two or more resource blocks include a first resource block and a last resource block of a transmission bandwidth,
   wherein the control signals are transmitted via the last resource block at one of the consecutive time domain units, if the control signals were transmitted via the first resource block at the other of the consecutive time domain units, and
   wherein the control signals are multiplied by the code sequence used for generating the pilot signals along with subcarriers at the second SC-FDMA symbols within each of the two or more resource blocks.

2. The method of claim 1, wherein each of the time domain units has 7 SC-FDMA symbols, and
   wherein each of the two or more resource blocks has 12 subcarriers.

3. The method of claim 2, wherein the pilot signals are multiplexed in a same manner with corresponding control signals.

4. The method of claim 1, wherein the code sequence is a CAZAC sequence identifying each of a plurality of mobile stations, and is generated by performing cyclic shift to the code sequence specific to each of the mobile stations.

5. The method of claim 1, wherein a length of the code sequence is determined by a number of subcarriers within each of the two or more resource blocks.

6. The method of claim 1, wherein the control signals include at least one of channel quality information (CQI), ACK/NACK signals, rank indicator (RI), and precoding matrix indicator (PMI).

* * * * *